United States Patent
Hu et al.

(10) Patent No.: US 7,090,815 B2
(45) Date of Patent: Aug. 15, 2006

(54) NANOMETER ENGINEERING OF METAL-SUPPORT CATALYSTS

(75) Inventors: Yongjun Jeff Hu, Boise, ID (US); Er-Xuan Ping, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/100,573

(22) Filed: Apr. 7, 2005

(65) Prior Publication Data

US 2006/0062710 A1 Mar. 23, 2006

Related U.S. Application Data

(62) Division of application No. 10/793,880, filed on Mar. 8, 2004, now Pat. No. 6,951,636, which is a division of application No. 09/805,203, filed on Mar. 14, 2001, now Pat. No. 6,750,172.

(51) Int. Cl.
*C01B 33/12* (2006.01)
*C01B 33/00* (2006.01)
*H01L 27/14* (2006.01)

(52) U.S. Cl. ............. 423/335; 423/324; 423/337; 257/414

(58) Field of Classification Search ......... 423/324, 423/325, 334, 335, 337; 502/200, 240, 254, 502/261, 262; 438/253–256, 396–399, 486, 438/488; 257/414; 73/23.2–31.07; 422/50–104
See application file for complete search history.

(56) References Cited

U.S. PATENT DOCUMENTS

| | | | |
|---|---|---|---|
| 4,049,584 A | 9/1977 | Weissel | |
| 4,943,549 A | 7/1990 | Immel et al. | |
| 5,278,091 A | 1/1994 | Fazan et al. | |
| 5,318,920 A | 6/1994 | Hayashide | |
| 5,753,559 A | 5/1998 | Yew et al. | |
| 5,796,484 A | 8/1998 | Honma et al. | |
| 5,872,033 A | 2/1999 | Figura | |
| 5,920,318 A | 7/1999 | Salvatore et al. | |
| 5,990,002 A | 11/1999 | Niroomand et al. | |
| 6,083,849 A | 7/2000 | Ping et al. | |
| 6,093,617 A | 7/2000 | Su et al. | |
| 6,103,568 A | 8/2000 | Fujiwara | |
| 6,103,570 A * | 8/2000 | Sandhu et al. | 438/255 |
| 6,117,731 A | 9/2000 | Wu | |
| 6,174,770 B1 * | 1/2001 | Chi | 438/255 |
| 6,204,156 B1 * | 3/2001 | Ping | 438/488 |
| 6,228,740 B1 | 5/2001 | Niroomand et al. | |
| 6,750,172 B1 * | 6/2004 | Hu et al. | 502/200 |
| 6,951,636 B1 * | 10/2005 | Hu et al. | 423/335 |

* cited by examiner

*Primary Examiner*—Colleen P. Cooke
(74) *Attorney, Agent, or Firm*—Dickstein Shapiro Morin & Oshinsky LLP

(57) ABSTRACT

A method of forming a catalyst body by forming a first layer of hemispherical grain polysilicon over a substrate, and oxidizing at least a portion of the first layer to form a second layer of silica. Additionally, forming a third layer of nitride material over the second layer, and forming a catalyst material over the nitride layer, can be performed before annealing to form a catalyst body.

33 Claims, 6 Drawing Sheets

NANOMETER ENGINEERING OF METAL-SUPPORT CATALYSTS

This application is a divisional of U.S. patent application Ser. No. 10/793,880 now U.S. Pat. No. 6,951,636, filed on Mar. 8, 2004, which in turn is a divisional of U.S. patent application Ser. No. 09/805,203 now U.S. Pat. No. 6,750,172, filed on Mar. 14, 2001; the entire disclosure of each is hereby incorporated by reference.

FIELD OF THE INVENTION

The present invention relates to catalysts, and more particularly, to a method of fabricating catalysts on a nanometer scale for wide ranging industrial applicability. The invention also relates to the catalyst structures so formed.

BACKGROUND OF THE INVENTION

Because of its economic importance, catalysis is one of the most intensely pursued subjects in applied chemistry and chemical engineering. Catalysts are widely used today to lower the activation energies that would otherwise prohibit important reactions from proceeding. Most industrial reactions are catalytic, and many process improvements thereto result from the discovery of better chemical routes, or as the result of attaining new ways to position catalysts to better interact with important chemical reactants. Ideally it is often best to expose as much of the catalyst as possible to the reactants in the reaction scheme.

Unfortunately, to-date, catalysis has been an inexact science on other than a macroscopic scale. Scientists are only beginning to understand the microscopic interplay between the catalyst and the surface or substrate upon which it is positioned. It is believed that these surface interactions may have a significant impact on ultimate catalyst stereochemistry and performance.

However, because of current process technological limitations it has been difficult to provide reaction vehicles which would facilitate microscopic catalyst formation. What is therefore needed in the art is a new method of forming a catalyst body that takes maximum advantage of the chemical and physical properties of both the catalyst and the substrate upon which it is formed at a nanometer-scale level.

SUMMARY OF THE INVENTION

The invention provides a method of forming a catalyst body on a nanometric scale sufficient to carry out microscopic (nanometric) catalysis reactions. The method comprises forming a first layer of hemispherical grain polysilicon over a substrate. At least a portion of the first layer is then oxidized to form a second layer of silica over the remaining portion of the first layer which has not been oxidized. A third layer of nitride is formed over the second layer, and a catalyst material is deposited on the nitride layer. The catalyst material is then annealed to form a catalyst body which causes the catalyst material to have a larger exposed surface area than just prior to annealing.

The invention provides a method for increasing the surface area of a catalyst material. A barrier layer is formed over a layer of silica, and a layer of catalyst material is then deposited over the barrier layer so as to form a catalyst body. The catalyst material incorporated into the catalyst body has more exposed surface area for reaction than when it has not been made a part of the catalyst body.

The invention also provides a method of converting a portion of hemispherical grain polysilicon to silica without substantially flattening the textured grain itself. The grain is heated to a temperature within the range of about 350 to about 750 degrees C. for a period not exceeding about 5 minutes.

The invention provides a catalyst body which has a first layer of hemispherical grain polysilicon, a second layer of silica formed from a portion of the polysilicon, a third layer of silicon nitride provided over the second layer, and a catalyst material layer provided over the third layer. The catalyst material layer is made up of at least one member selected from Group VIII metals and zeolites.

The invention provides a catalyst body having a first layer of hemispherical grain polysilicon, a second layer of silica formed from a portion of the hemispherical grain polysilicon, and a catalyst material layer formed over the second layer.

The invention also provides a sensor device which has a catalyst body formed over a substrate. The catalyst body comprises a first layer of hemispherical grain polysilicon, a second layer of silica formed over the first layer, a third layer of nitride formed over the silica layer, and a catalyst material layer formed over the nitride layer. It is desirable that the catalyst material layer be more expansive, e.g. extend further perimeter wise, than at least one of the underlying layers.

These and other advantages and features of the present invention will become more readily apparent from the following detailed description and drawings which illustrate various exemplary embodiments.

DETAILED DESCRIPTION OF THE PREFERRED EMBODIMENTS

The invention is directed to a method of forming a catalyst body, and also to the catalyst body produced in accordance therewith.

Figure 1:
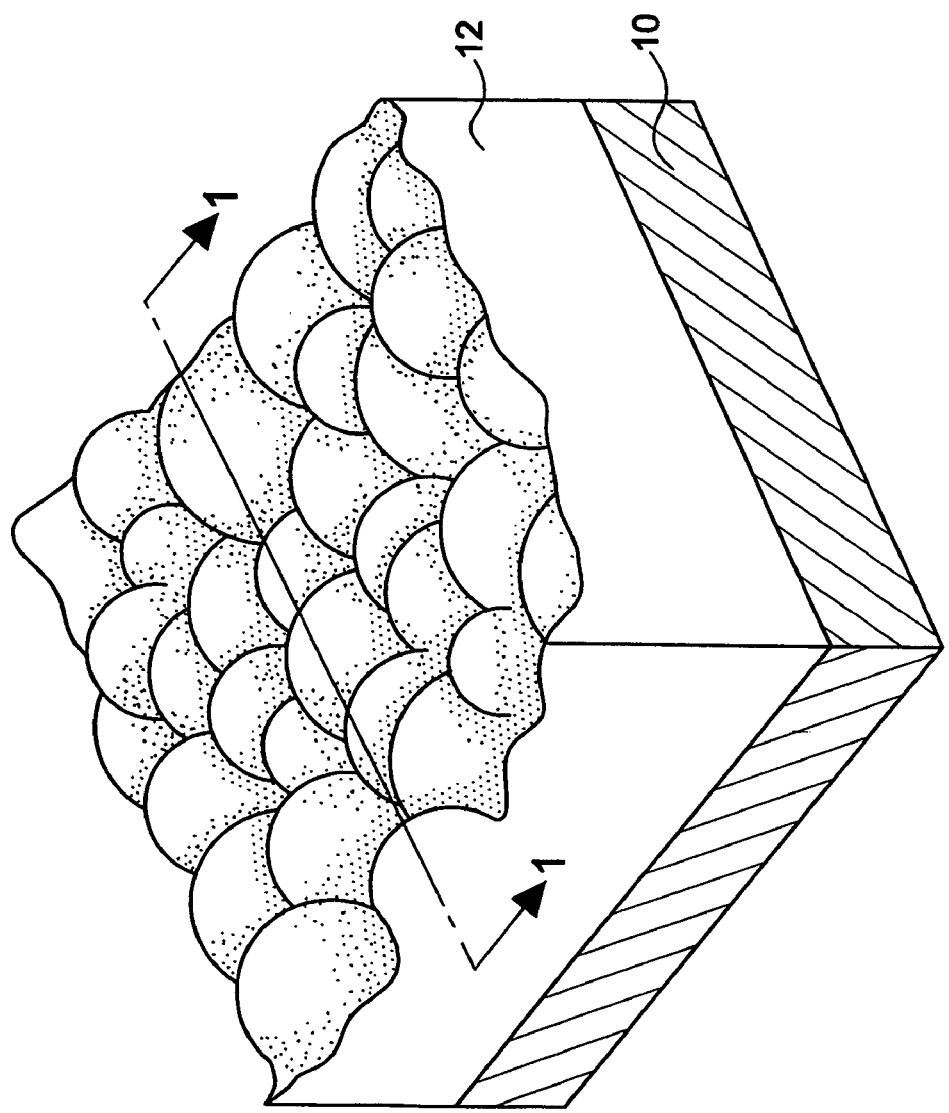
FIG. 1 is a three-dimensional exposed view of a hemispherical grain polysilicon (HSG) substrate formed as part of the process for making a catalyst body according to the method of the invention.
Figure 1A:
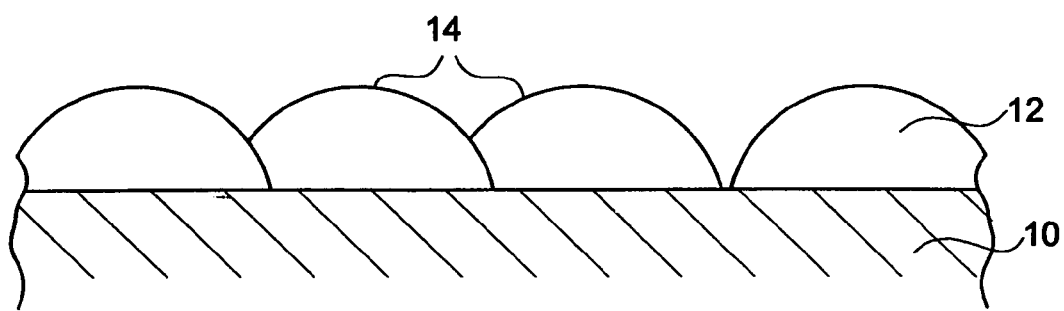
FIG. 1A is a cross sectional side view of the polysilicon shown in FIG. 1A along the line 1—1.

Referring now to the drawings, in which like numerals indicate like components throughout the various embodiments, FIG. 1 is an exposed three-dimensional view of a hemispherical grain (HSG) polysilicon layer 12 which has been formed on a generic substrate 10. The substrate 10 can be comprised of silicon, silicon-on-insulator, other semiconductor materials, or insulator material, and can also be any type of industrial base or foundation structure. FIG. 1A is an exposed side view of the embodiment shown in FIG. 1. The HSG polysilicon layer 12 is characterized by its textured, bumpy surface as illustrated in the drawings. To form the HSG polysilicon layer 12 shown in the figures, amorphous silicon is first deposited on substrate 10 using one or more available techniques such as chemical vapor deposition (CVD), low pressure chemical vapor deposition (LPCVD) or rapid thermal chemical vapor deposition (RTCVD). Preferably, LPCVD is utilized within a temperature range of about 400 to about 600 degrees C., with about 450 to about 550 degrees C. being preferred, and, at a pressure within the range of about 0.1 to 10 milliTorr, with about 0.5 to 1 milliTorr being desirable. Alternatively, the HSG polysilicon layer 12 may be formed as described above, but with the additional step of exposing the surface to a solution of tetramethylammonium hydroxide (TMAH) and hydrogen fluoride (HF) as set forth in U.S. Pat. No. 6,083,849 to Ping et al., incorporated herein by reference. After formation of the layer 12, the HSG polysilicon will contain individual grains or bumps 14 which are approximately 50 to 80 nanometers in diameter and about 25 to about 100 nanometers high.

Figure 2:
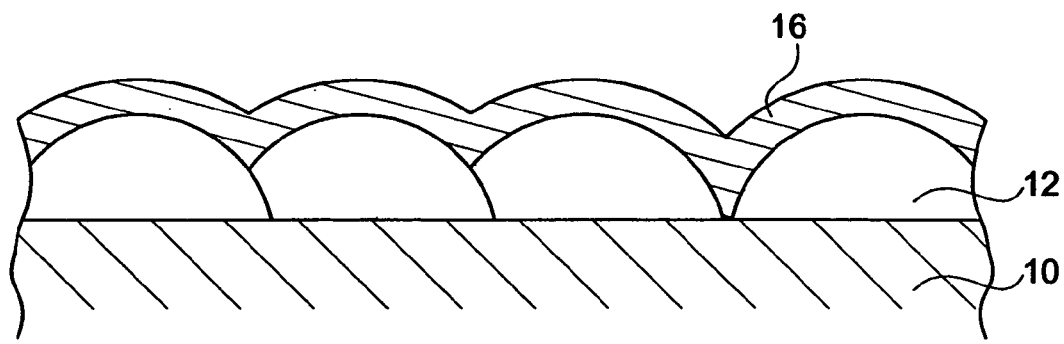
FIG. 2 is the catalyst body of FIG. 1A in a further stage of preparation.

Referring now to FIG. 2, once the HSG polysilicon layer 12 has been formed, at least a portion thereof is converted to a silica ($SiO_2$) layer 16 to provide a support for a subsequently deposited catalyst material. An oxidation process, or more preferably a rapid thermal oxidation (RTO) process, can be utilized for this purpose. In this procedure, the HSG polysilicon layer 12 is exposed to an oxygen ($O_2$) plasma in a suitable reaction chamber which is generally available. Oxidation temperatures are relatively low, and are typically within the range of about 350 degrees C. to about 750 degrees C. A temperature range of about 400 degrees C. to about 500 degrees C. is more preferred, with a range of about 450 degrees C. to about 500 degrees C. being even more desirable. The time for reaction should be relatively short, on the order of no more than a few minutes. Preferably, the reaction time should be within the range of about 1 minute to about 5 minutes. It has now been found that shorter reaction times make it possible to attain a silica layer 16 which covers at least a portion of, and more preferably most of, and even more preferably substantially all of the polysilicon layer 12, but one which will not flatten the textured surface of the underlying layer 12. It is furthermore desirable to obtain a silica layer which is on the order of about a few Angstroms thick, e.g. about 1 to about 5 Angstroms, up to about 50 Angstroms thick, and preferably about 20 to about 50 Angstroms in thickness.

Figure 3A:
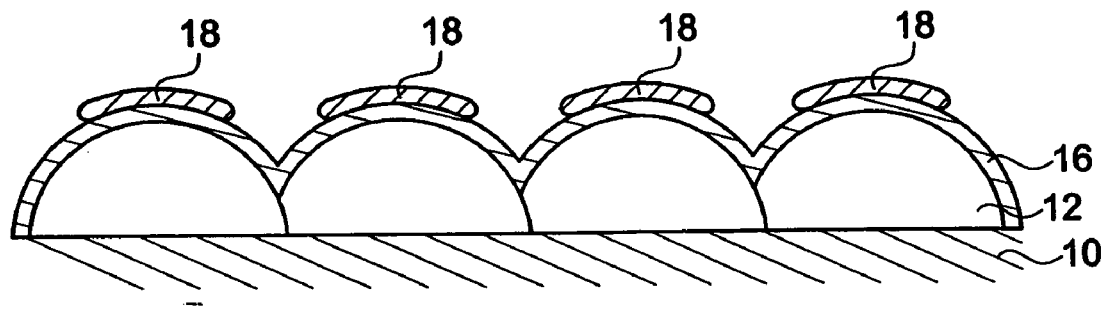
FIG. 3A is the catalyst body of FIG. 2 in a further stage of preparation.
Figure 3B:
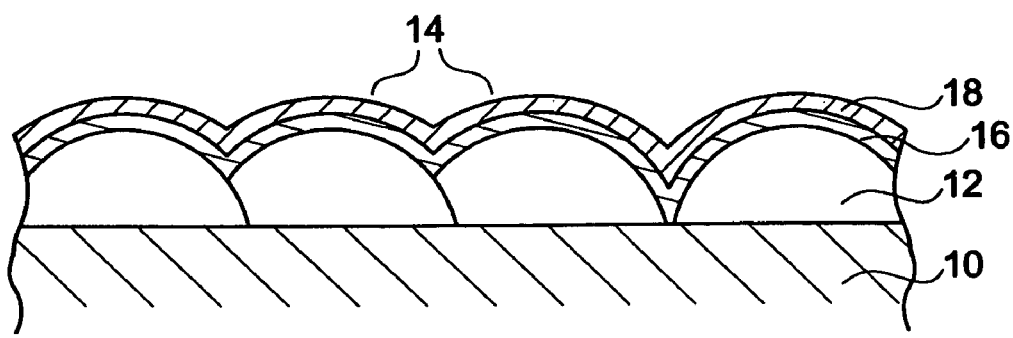
FIG. 3B is the catalyst body of FIG. 2 in a further stage of preparation according to another alternative embodiment of the invention.

In a further embodiment of the invention shown in FIGS. 3A and 3B, a nitride layer 18 may be formed atop the silica layer 16 using available techniques such as rapid thermal nitridation (RTN). For example, ammonia ($NH_3$) plasma may be presented in a suitable reaction chamber to form a silicon nitride ($Si_3N_4$) layer 18 over the silica layer 16. Other available nitride materials can also constitute the layer 18. Thus, ammonia diffused with oxygen may be used to form a silicon oxynitride layer, and this layer would also be encompassed under the more generic term "nitride layer".

The nitride layer 18 may also be referred to as a barrier layer which may help to prevent any subsequently deposited catalytic metallic ions from penetrating too deeply into the silica layer. In this way, the deposited catalyst material will be better positioned to anneal into a more efficacious catalyst surface, as hereinafter described. The nitride layer 18 may be a discontinuous layer as shown in FIG. 3A, or as shown in FIG. 3B may be a continuous layer. It can vary in depth from a few Angstroms, e.g. about 1 to about 5 Angstroms, up to a few hundred Angstroms, e.g. about 100 to about 500 Angstroms. In an alternative embodiment of the invention as shown in FIG. 3C, the nitride layer 18 may be formed as a continuous layer 18 between the HSG polysilicon layer 12 and the silica layer 16, again using the method of nitridation as heretofore described.

Figure 3C:
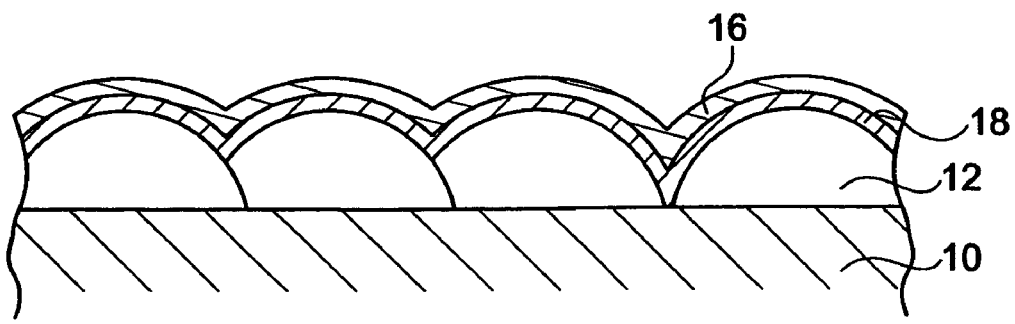
FIG. 3C is the catalyst body of FIG. 2 in a further stage of preparation according to an alternative embodiment of the invention.

As set forth, the nitride layer 18 shown in FIGS. 3A through 3C can, in some embodiments, function as a barrier layer. For example, layer 18 in FIGS. 3A and 3B may serve to prevent unwarranted chemical interactions between a subsequently deposited catalyst material layer (hereinafter described) and the silica layer 16. Thus, the nitride layer 18 may also sometimes be referred to as a generic barrier layer 18. Other available chemical compounds which therefore function as barrier material, in addition to silicon nitride or silicon oxynitride, may also be utilized as a barrier layer as part of the invention.

Those skilled in the art may discover that the degree of nitridation (or oxynitridation) and thus the extent of the nitride layer 18 (in the x, y and z directions) may be modified to control the crystal orientation of the subsequently deposited metal catalyst material. The degree of nitridation may also be regulated to increase the catalyst surface area, e.g. the extent to which the deposited catalyst material "balls up" on the surface of the nitride layer, thereby exposing more of its surface area.

Figure 4A:
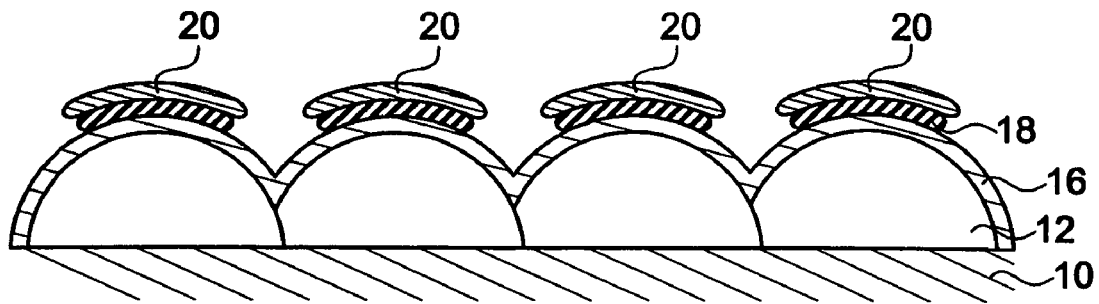
FIG. 4A is the catalyst body of FIG. 3A in a further stage of preparation.
Figure 4B:
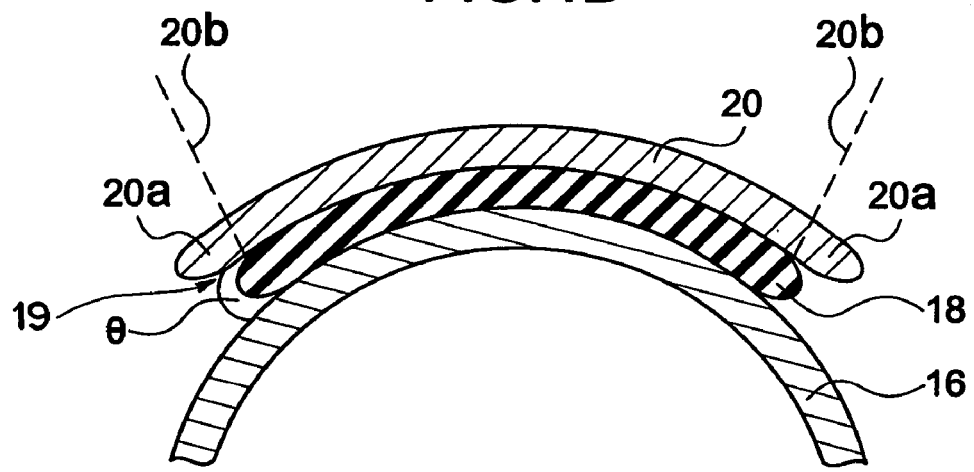
FIG. 4B is a close-up view of the catalyst body shown in FIG. 4A.

For purposes of further discussion, the invention will be described with reference to the use of the structure shown in FIG. 3A which has a discontinuous nitride layer 18 over the silica layer 16. However, it is to be understood that the fabrication steps described below can be applied to the structures of FIGS. 3B and 3C as well. Referring now to FIGS. 4A and 4B, a catalyst material layer 20 is next deposited over the nitride layer 18 using techniques such as physical vapor deposition (PVD). Any sort of catalyst material is contemplated for use with the invention, in particular those catalysts based on the transition metals of Group VIII of the periodic table. For example, suitable non-limiting catalysts can include iron (Fe), cobalt (Co), nickel (Ni), ruthenium (Ru), rhodium (Rh), palladium (Pd), osmium (Os), iridium (Ir) and platinum (Pt), as well as their alloys, oxides, salts (e.g. $PdCl_2$), and metallic complexes, etc. Of these, ruthenium, cobalt, palladium and platinum may be preferred in many applications. Other useful catalysts can include zeolites. The deposition process is performed so as to yield a catalyst material layer 20 of about 5 to about 500 Angstroms over the nitride layer 18. The catalyst material layer 20 may be a continuous layer (if the structure shown in FIG. 3B has been utilized), or as shown in FIGS. 4A and 4B may be a discontinuous layer which is formed over areas containing the nitride layer 18.

The catalyst material layer 20 is deposited so as to be at least partially, and more desirably, substantially co-extensive with the nitride layer 18. More preferably, however, the catalyst material layer 20 is larger than, e.g. extends outwardly of, the underlying nitride layer 18 so that an angle θ is formed between an extending segment portion 20a of the catalyst material layer 20 and the silica layer 16, as measured from the meeting point 19 shown in FIG. 4B where the catalyst material 20 contacts the nitride layer 18. The angle θ may be referred to herein as the wetting angle. It is desirable that there be an extending segment portion 20a for at least a part of the perimeter of the catalyst material layer 20, and preferably for at least most or even all of the perimeter of the catalyst material layer. The extending segment portion 20a will preferably be less than about 10 Angstroms in length as measured from the dotted line 20b which crosses the endpoint of the underlying layer 18 (which in FIG. 4B coincides with the meeting point 19). Thus, in a preferred embodiment, the catalyst material layer 20, together with its extending segment portion 20a, can extend outwardly to be at least about 10% larger than the nitride layer 18. Even more preferably, the layer 20 can extend outwardly to be at least about 20% larger than the layer 18.

Figure 4C:
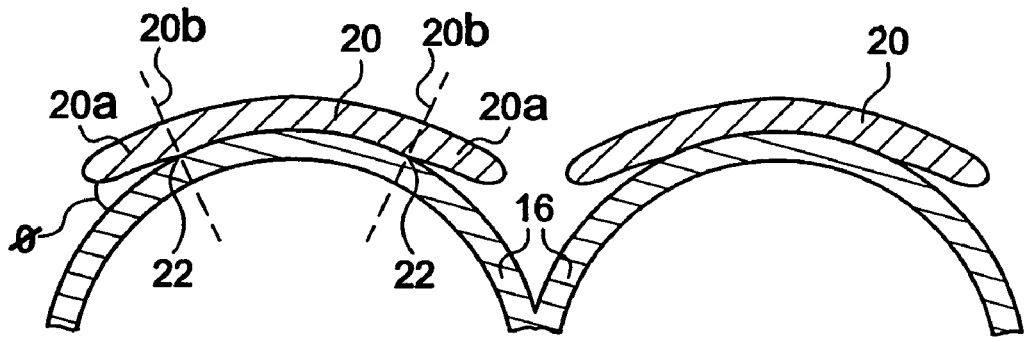
FIG. 4C is a close-up view of the catalyst body shown in FIG. 4B in an alternative embodiment of the invention.

In an alternative embodiment of the invention shown in FIG. 4C, there is no nitride layer 18 formed, and a catalyst material layer 20 has been formed over the silica layer 16. There is also shown a wetting angle φ which is formed between the extending portion 20a of the catalyst material layer 20 and the top of the silica layer 16. In this embodiment, the line 20b crosses the meeting point 22 of the catalyst material layer 20 and the underlying silica layer 16. The extending segment portion 20a is thus measured from the line 20b.

The wetting angles θ and φ shown in FIGS. 4B and 4C, respectively, are representative of non-wetting materials generally. The wetting angle θ and φ is a thermodynamic variable that depends on the interfacial tensions of the surfaces, and can be less than about 60 degrees for each alternative embodiment.

Figure 5A:
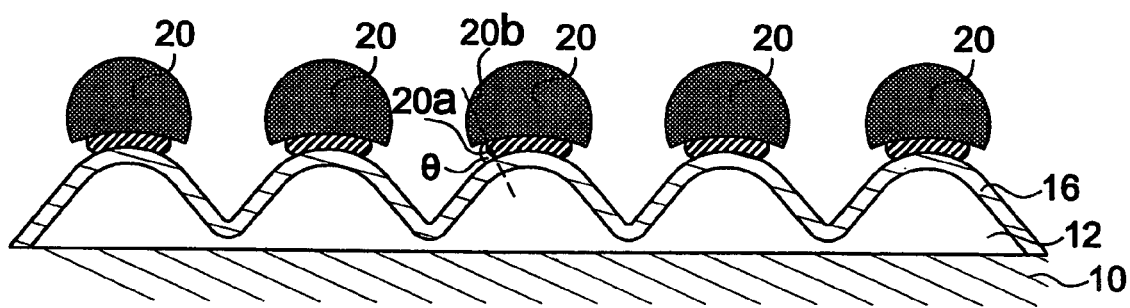
FIG. 5A is the catalyst body of FIG. 4A in a further stage of preparation.
Figure 5B:
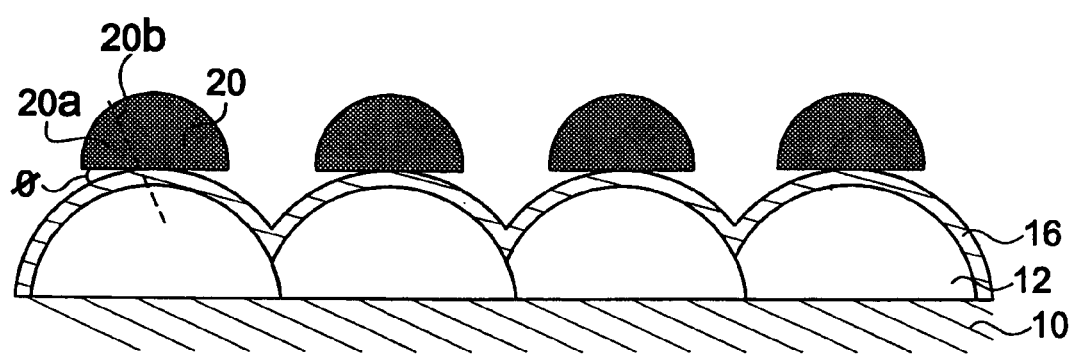
FIG. 5B is the catalyst body of FIG. 4C in a further stage of preparation.

Referring now to FIGS. 5A and 5B, after deposition of the catalyst material, gas annealing is utilized to convert the amorphous deposited catalyst material layer 20 into a more ordered mass, preferably a more ordered crystalline mass, which exposes more surface area of the catalyst material itself than before annealing is performed. The annealing process is typically conducted at a temperature within the range of about 200 to about 500 degrees C. In one embodiment, the catalyst material layer 20 may be transformed into a protruding bump-like bulging structure (when viewed in two dimensions) or a bullet-shaped structure (when viewed in three dimensions), as shown in FIGS. 5A and 5B. While FIGS. 5A and 5B show the corners of the catalyst material layer 20 to be bulging or rounded, it is also within the scope of the invention that these corners also be substantially pyramidal as well. Other shapes of the annealed catalyst material layer 20 which will facilitate increased exposed surface area of the catalyst are also within the scope of the invention, and thus the shape of the embodiments shown in FIGS. 5A and 5B should not be construed as limiting. Once again, the skilled artisan may discover that the degree of nitridation and the subsequent extent of the nitride layer 18 may be modified to in turn affect the surface area of the deposited catalyst.

It is also preferred that wetting geometry and the extending segment portion 20a be substantially preserved after the annealing process. Thus respective wetting angles φ and θ shown in FIGS. 5A and 5B preferably remain after annealing, but may also be somewhat larger or smaller than before the annealing process.

In FIG. 5B, an alternative embodiment of the invention is shown in which the catalyst material 20 has been annealed over the silica layer 16, where no nitride layer 18 has been formed (from FIG. 4C). The wetting geometry and extending segment portion 20a and wetting angle φ are shown as well. After annealing is complete, the catalyst bodies shown in FIGS. 5A and 5B are then ready for use in various catalytic applications.

In a further embodiment of the invention, the catalyst material 20 may be deposited using available masking techniques, for example. The masks may be patterned to form the catalyst material 20 directly over the nitride layer 18 (FIG. 5A) or the silica layer 16 (FIG. 5B). In this way, it is possible to eliminate the intervening embodiments shown in FIGS. 4A and 4C, respectively.

One application of the catalyst body formed in accordance with the invention is in traditional "cracking" operations, in which a catalyst is utilized to crack or rupture carbon-carbon (C—C) bonds, usually to convert a larger molecular weight hydrocarbon into two or more smaller hydrocarbons, e.g. conversion of a paraffin to another paraffin and one or more olefins or conversion into two or more olefins. The catalyst bodies set forth in FIGS. 5A and 5B may be utilized in such reactions, under generally available reaction conditions and parameters, e.g. at a temperature range of about 200 to about 600 degrees C., in a suitable cracking reactor. Myriad other catalyst reactions are available to the skilled artisan, and are also contemplated for use with the catalyst bodies of the invention.

Figure 6:
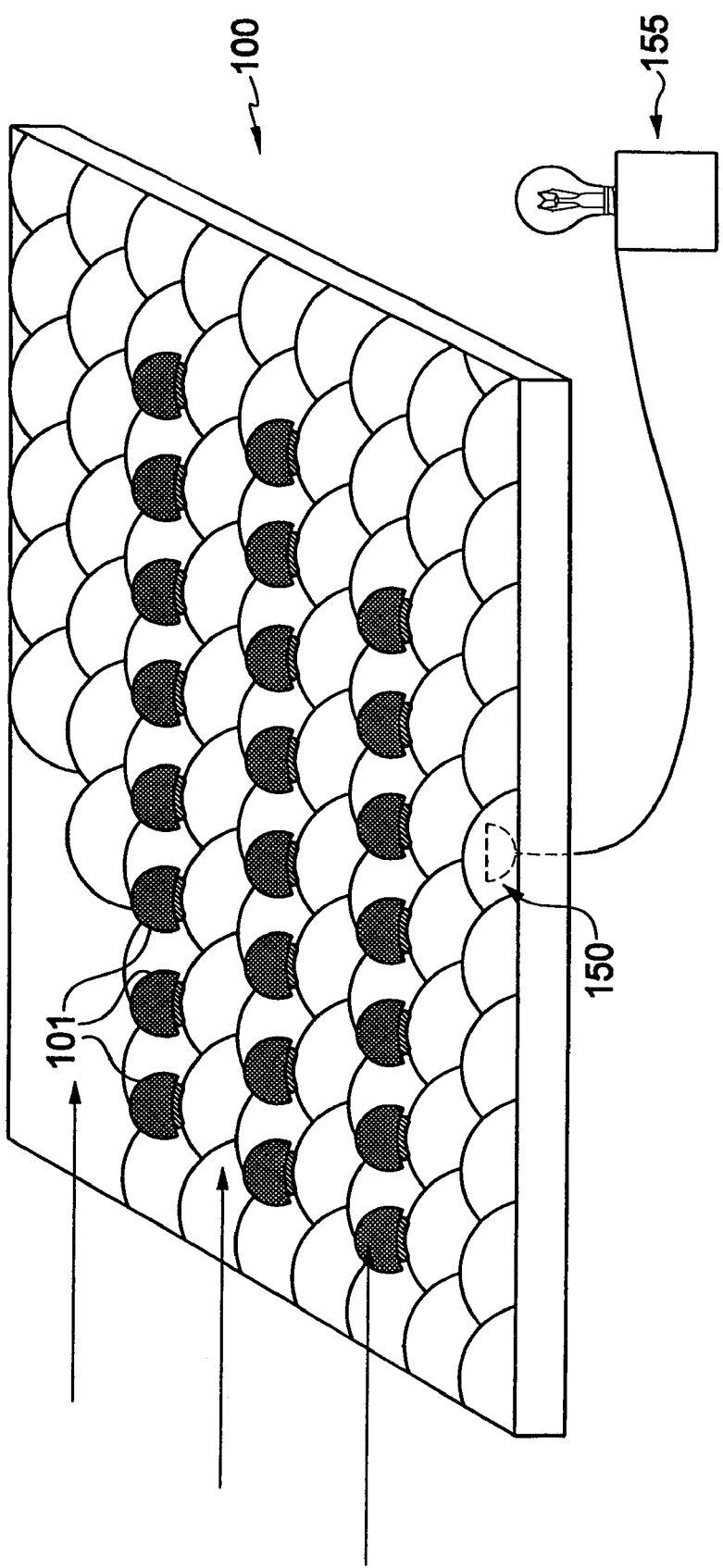
FIG. 6 illustrates an application of the catalyst body formed in FIG. 5.

FIG. 6 represents a further application of the invention in which a sensor 100 is built using catalyst bodies 101 which have been formed according to one of the embodiments heretofore described. As can be seen in the figure, a large array of individual catalyst bodies has been formed on a nanometric scale. In this regard, air which is suspected of containing a material such as for example, a contaminant, can be wafted over the sensor 100. As the suspected material contacts the formed catalyst material layer 20, catalysis of a reaction can then occur between the air-borne material or contaminant and a second reaction material which may present together with the catalyst as in for example, a catalytic metal complex. The reaction between the air-borne material and the second reaction material may then be detected by any available means, including one or more electrical or optical sensor units 150 which may be located above or below the sensor 100, the output of which may be fed to an indicator 155. The indicator may be visual or audio in nature. The electrical or optical sensor unit 150 may detect a change in electrical properties, e.g. resistance, or a change in optical properties, e.g. reflectance, of the sensor 100 caused by reactions with the catalyst material. Additionally, the chemical sensor application can utilize the sticking coefficient of the chemical gas to be detected (e.g., hydrogen) to determine the chemical composition of the gas. The sticking coefficient is a measure of the fraction of incident molecules which adsorb upon the surface, it lies within the range of 0–1, where the limits correspond to zero adsorption and total adsorption of all incident molecules respectively. By determining the mass loss to the total gas composition, the saturation of chemicals to the sensor surface can be detected, and thus the presence of a given chemical can be analyzed.

As a result of the invention according to one or more of the embodiments heretofore described, fabrication of several types of catalyst bodies is now possible in which various structures can be formed with exacting precision on a nanometric level. These structures are useful in a wide variety of catalytic reactions, and therefore can improve the start of the art of catalysis itself.

The foregoing description is illustrative of exemplary embodiments which achieve the objects, features and advantages of the present invention. It should be apparent that many changes, modifications, substitutions may be made to the described embodiments without departing from the spirit or scope of the invention. The invention is not to be considered as limited by the foregoing description or embodiments, but is only limited by the construed scope of the appended claims.

The invention claimed is:

1. A catalyst body, comprising:
   a layer of hemispherical grain polysilicon;
   a layer of silica over said layer of hemispherical silicon grain polysilicon; and
   a catalyst material over said layer of silica.

2. The catalyst body of claim 1, further comprising:
   a barrier layer between said second layer of silica and said catalyst material; and
   said catalyst material comprising a material selected from the group consisting of Group VIII metals and zeolites.

3. The catalyst body of claim 2, wherein said silica layer is within the range of about 5 Angstroms to about 50 Angstroms in thickness.

4. The catalyst body of claim 3, wherein said silica layer is within the range of about 20 Angstroms to about 50 Angstroms in thickness.

5. The catalyst body of claim 2, wherein said barrier layer is a continuous nitride layer.

6. The catalyst body of claim 5, wherein said barrier layer is a discontinuous nitride layer.

7. The catalyst body of claim 5, wherein said nitride layer is a silicon nitride layer which is formed to a thickness within the range of about 1 to about 500 Angstroms.

8. The catalyst body of claim 2, wherein said catalyst material is at least co-extensive with said barrier layer.

9. The catalyst body of claim 6, wherein said catalyst material has an extending segment portion with respect to an underlying portion of said nitride layer.

10. The catalyst body of claim 9, wherein said extending segment portion forms an acute angle with respect to said silica layer.

11. The catalyst body of claim 6, wherein said catalyst material forms a layer that is at least about 10% more extensive than said nitride layer.

12. The catalyst body of claim 11, wherein said catalyst material layer is at least about 20% more extensive than said nitride layer.

13. The catalyst body of claim 12, wherein said catalyst material layer is annealed to form a structure having increased surface area.

14. The catalyst body of claim 13, wherein said extending segment portion is preserved after said annealing.

15. A sensor device, comprising:
    a catalyst body formed over a substrate; and
    a sensor unit coupled to said catalyst body and capable of detecting a catalyzed reaction at said catalyst body and providing a signal representing occurrence of said catalyzed reaction, wherein said catalyst body comprises:
    a layer of hemispherical grain polysilicon; and
    a layer of silica over at least a portion of said hemispherical grain polysilicon layer.

16. The device of claim 15, wherein said catalyst body further comprises a catalyst material layer over said layer of silica.

17. The device of claim 16, wherein said catalyst material layer is more extensive than said layer of silica.

18. The device of claim 16, further comprising a layer of silicon nitride over said silica layer, and wherein said catalyst material layer is over said layer of silicon nitride.

19. The device of claim 18, wherein said catalyst material layer is more extensive than said layer of silicon nitride.

20. The device of claim 16, wherein said catalyst material comprises a material selected from the group consisting of Group VIII metals and zeolites.

21. The device of claim 16, wherein said catalyst material comprises at least one metal selected from the group consisting of rhodium, ruthenium, platinum and palladium.

22. The device of claim 17, wherein said catalyst material layer is non-wetting over said silica layer.

23. The device of claim 19, wherein said catalyst material layer is non-wetting over said silica layer.

24. The device of claim 16, wherein said device has sites in which catalyst material layer is bump-like in shape.

25. The device of claim 16, wherein said silica layer has a thickness which is within the range of about 20 Angstroms to about 50 Angstroms.

26. A catalyst structure, comprising:
    a hemispherical grain polysilicon layer over a substrate, said hemispherical grain polysilicon layer having a textured surface;
    a silica layer over said hemispherical silicon grain polysilicon layer, wherein said silica layer substantially covers the textured surface of the hemispherical grain polysilicon layer and substantially contours to the textured surface;
    a plurality of barrier layer caps over the contours of said silica layer; and
    a catalyst protrusion over each said barrier layer caps, said catalyst protrusion being at least co-extensive with each said barrier layer caps.

27. The catalyst structure of claim 26, wherein said catalyst protrusion comprises a material selected from the group consisting of Group VIII metals and zeolites.

28. The catalyst structure of claim 26, wherein said silica layer is between about 1 Angstrom to about 50 Angstroms thick.

29. The catalyst structure of claim 26, wherein said plurality of barrier layer caps comprise a nitride.

30. The catalyst structure of claim 26, wherein said catalyst protrusion is at least 10% larger with respect to the underlying portion of the respective said nitride layer cap.

31. The catalyst structure of claim 26, wherein said catalyst protrusion is crystalline in structure.

32. The catalyst structure of claim 26, wherein said catalyst body is part of a cracking apparatus.

33. The catalyst structure of claim 26, wherein said catalyst body is part of a sensor apparatus.

* * * * *